(12) United States Patent
Chan et al.

(10) Patent No.: US 8,644,712 B2
(45) Date of Patent: Feb. 4, 2014

(54) OPTO-ELECTRONIC TRANSCEIVER MODULE WITH HOUSING HAVING THERMALLY CONDUCTIVE PROTRUSION

(75) Inventors: Seng-Kum Chan, Santa Clara, CA (US); David J. K. Maedowcroft, San Jose, CA (US)

(73) Assignee: Avago Technologies General IP (Singapore) Pte. Ltd. (SG)

( * ) Notice: Subject to any disclaimer, the term of this patent is extended or adjusted under 35 U.S.C. 154(b) by 309 days.

(21) Appl. No.: 13/167,530

(22) Filed: Jun. 23, 2011

(65) Prior Publication Data

US 2012/0327668 A1    Dec. 27, 2012

(51) Int. Cl.
*H04B 10/40*    (2013.01)
*H04B 10/00*    (2013.01)

(52) U.S. Cl.
USPC ............................ 398/138; 398/139; 398/164

(58) Field of Classification Search
USPC ......... 398/83, 135, 138, 139, 164; 385/14, 15
See application file for complete search history.

(56) References Cited

U.S. PATENT DOCUMENTS

| 5,729,563 | A | 3/1998 | Wang et al. |
| 6,948,864 | B2 | 9/2005 | Reilly et al. |
| 7,331,720 | B1 | 2/2008 | McColloch |
| 7,547,151 | B2 * | 6/2009 | Nagasaka ...................... 385/93 |
| 7,637,672 | B1 * | 12/2009 | Li et al. ........................... 385/92 |
| 7,796,657 | B2 * | 9/2010 | Mogi ............................... 372/34 |
| 2005/0094688 | A1 | 5/2005 | Scofet et al. |
| 2010/0035372 | A1 | 2/2010 | Gauggel et al. |

\* cited by examiner

*Primary Examiner* — Dalzid Singh

(57) ABSTRACT

An opto-electronic communication module includes a housing, a circuit substrate, and an opto-electronic communication device, such as a laser, mounted on the circuit substrate. A protrusion that is unitarily formed in the housing extends through the circuit substrate to provide a thermal path to promote dissipation of heat emitted by the opto-electronic communication device.

20 Claims, 8 Drawing Sheets

OPTO-ELECTRONIC TRANSCEIVER MODULE WITH HOUSING HAVING THERMALLY CONDUCTIVE PROTRUSION

BACKGROUND

In an optical communication system, it is generally necessary to couple an optical fiber to an opto-electronic transmitter, receiver or transceiver device and, in turn, to couple the device to an electronic system such as a switching system or processing system. These connections can be facilitated by modularizing the transceiver device. An opto-electronic transceiver module commonly includes an opto-electronic light source, such as a laser, and an opto-electronic light receiver, such as a photodiode, and may also include various electronic circuitry associated with the laser and photodiode. For example, driver circuitry can be included for driving the laser in response to electronic signals received from the electronic system. Likewise, receiver circuitry can be included for processing the signals produced by the photodiode and providing output signals to the electronic system. Optics such as lenses and reflectors may also be included. Although there are many considerations involved in the design of an opto-electronic transmitter, receiver or transceiver device, one such consideration relates to dissipating heat generated by the laser.

As illustrated in cross section in FIG. 1, a conventional opto-electronic transmitter device 100 includes a housing 112, a laser 114, an integrated circuit chip 116 having driver circuitry for laser 114, and an optical assembly 118. It should be noted that opto-electronic transmitter device 100 is shown in a generalized form in FIG. 1 for purposes of clarity. All but a portion of housing 112 is shown in broken line to indicate that it can have any suitable shape or configuration. For example, housing 112 can have the elongated, rectangular shape associated with the standard configuration commonly referred to in the art as Small Form Factor (SFF) or Small Form Factor Pluggable (SFP). Laser 114 can comprise, for example, a vertical cavity surface-emitting laser (VCSEL). In operation, laser 114 emits light along an axis 115. Optical assembly 118 is made of an optically transparent material and includes a generally cylindrical or barrel-shaped receptacle portion 120 to which an optical plug at the end of a fiber-optic cable (not shown) can be mated. One or more lenses 121 can be included in optical assembly 118, as known in the art.

Laser 114 and integrated circuit chip 116 are sealed within a lower portion 122 of optical assembly 118 that is attached to an upper surface of a printed circuit board 124. Integrated circuit chip 116 is mounted on the upper surface of printed circuit board 124. Laser 114 is mounted on a metal region 126 on the upper surface of printed circuit board 124. Laser 114, integrated circuit chip 116, and electrical connections (not shown) on the surface of printed circuit board 124 are interconnected by wirebonds 127, only one of which is shown for purposes of clarity. A number of vias 128 or metal-plated through-holes filled with a thermally conductive material such as solder extend through printed circuit board 124 between metal region 126 and the lower surface of printed circuit board 124. During operation of laser 114, vias 128 conduct excess heat away from metal region 126, which transmits the excess heat produced by laser 114. A thermal gap pad 130 between an interior wall of housing 112 and the lower surface of printed circuit board 124 transmits the heat from vias 128 to housing 112. Although not shown for purposes of clarity, in operation, when opto-electronic transmitter device 100 is plugged into a bay or port in an electronic system, heat is dissipated from housing 112 by air flow or additional heat sinks that are included in the electronic system.

As illustrated in cross section in FIG. 2, another conventional opto-electronic transmitter device 200 includes a housing 212, a laser 214, an integrated circuit chip 216 having driver circuitry for laser 214, and an optical assembly 218. It should be noted that opto-electronic transmitter device 200 is shown in a generalized form in FIG. 2 for purposes of clarity. All but a portion of housing 212 is shown in broken line to indicate that it can have any suitable shape or configuration. For example, housing 212 can have the shape associated with an SFF or SFP configuration. Laser 214 can comprise, for example, a VCSEL. In operation, laser 214 emits light along an axis 215. Optical assembly 218 is made of an optically transparent material and includes a generally cylindrical or barrel-shaped receptacle portion 220 to which an optical plug at the end of a fiber-optic cable (not shown) can be mated. One or more lenses 221 can be included in optical assembly 218, as known in the art.

Laser 214 and integrated circuit chip 216 are sealed within a lower portion 222 of optical assembly 218 that is attached to an upper surface of a printed circuit board 224. Integrated circuit chip 216 is also mounted on the upper surface of printed circuit board 224. A metal slug 226 extends through printed circuit board 224 between the upper surface and the lower surface. Laser 214 is mounted on a region of metal slug 226 near the upper surface of printed circuit board 224. Laser 214, integrated circuit chip 216, and electrical connections (not shown) on the surface of printed circuit board 224 are interconnected by wirebonds 227, only one of which is shown for purposes of clarity. During operation of laser 214, metal slug 226 conducts excess heat away from laser 214. A thermal gap pad 228 between an interior wall of housing 212 and the lower surface of metal slug 226 transmits the heat from metal slug 226 to housing 212. Although not shown for purposes of clarity, when opto-electronic transmitter device 100 is plugged into a bay or port in an electronic system and is operating, heat is dissipated from housing 212 by air flow or additional heat sinks that are included in the electronic system.

SUMMARY

Embodiments of the present invention relate to an opto-electronic communication module that includes a housing, a circuit substrate, and an opto-electronic communication device such as a laser or photodiode mounted on the circuit substrate, wherein a protrusion that is unitarily formed in a metal wall of the housing extends through the circuit substrate to provide a thermal path to promote dissipation of heat emitted by the opto-electronic communication device.

In an exemplary embodiment, the circuit substrate provides electrical interconnections for circuitry mounted on the circuit substrate and has an opening extending through it between its first and second surfaces. The opto-electronic communication device is mounted on a metalized region of the first surface of the circuit substrate. The housing has an optical signal port and walls that substantially enclose the circuit board. One or more of the walls may be made of metal or similar thermally conductive material. A wall in which the protrusion is unitarily formed is adjacent to the second surface of the circuit substrate, and the protrusion extends through the opening in the circuit substrate and contacts the metalized region on the first surface of the circuit substrate. Thus, the metalized region transmits heat emitted by the opto-electronic communication device to the protrusion, which in turn transmits the heat to the wall of the housing.

Other systems, methods, features, and advantages will be or become apparent to one with skill in the art upon examination of the following figures and detailed description. It is intended that all such additional systems, methods, features, and advantages be included within this description, be within the scope of the specification, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention.

DETAILED DESCRIPTION

Figure 3:
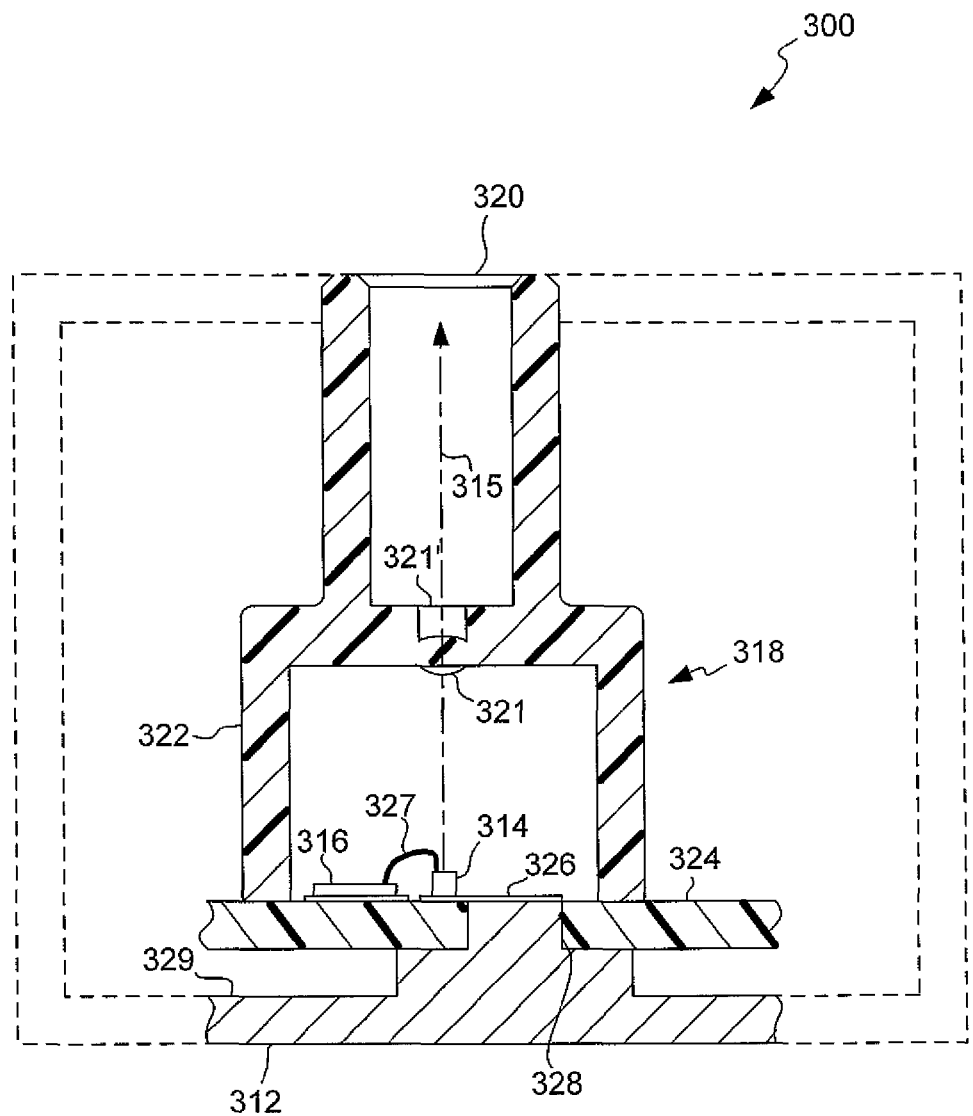
FIG. 3 is a sectional view of generalized portion of an opto-electronic transceiver module, in accordance with the present invention.

As illustrated in FIG. 3, in an illustrative or exemplary embodiment of the invention, an opto-electronic transceiver module 300 includes a housing 312, a laser 314, an integrated circuit chip 316 having driver circuitry for laser 314, and an optical assembly 318. It should be noted that opto-electronic transceiver module 300 is shown in a generalized form in FIG. 3. All but a portion of housing 312 is shown in broken line to indicate that it can have any suitable shape or configuration. At least some of the walls of housing 312 are made of metal or similar thermally conductive material. Laser 314 can comprise, for example, a VCSEL. In operation, laser 314 emits light along an axis 315. Optical assembly 318 is made of an optically transparent material and includes a generally cylindrical or barrel-shaped receptacle portion 320 to which an optical plug at the end of a fiber-optic cable (not shown) can be mated. Receptacle portion 320 thus serves as an optical signal port for opto-electronic transceiver module 300. One or more lenses 321 can be included in optical assembly 318, as known in the art.

Laser 314 is mounted on a metal region 326 on the upper surface of a printed circuit board 324. Integrated circuit chip 316 is also mounted on the upper surface of printed circuit board 324. Laser 314 and integrated circuit chip 316 are sealed within a lower portion 322 of optical assembly 318. Laser 314, integrated circuit chip 316, and electrical connections (not shown) on the surface of printed circuit board 324 are interconnected by wirebonds 327, only one of which is shown for purposes of clarity. A protrusion 328 that is unitarily formed with an interior metal wall 329 of housing 312 adjacent to printed circuit board 324 extends through an opening in printed circuit board 324. The opening can be a plated through-hole similar to a conventional via or metal slug but larger in diameter. During operation of laser 314, protrusion 328 conducts excess heat produced by laser 314 away from metal region 326. As protrusion 328 is unitarily formed with interior wall 329 of housing 312, protrusion 328 transmits the heat to housing 312. Although not shown in FIG. 3 for purposes of clarity, when opto-electronic transceiver module 300 is plugged into a bay or port in an electronic system and is operating, heat is dissipated from housing 312 by air flow or additional heat sinks that are included in the electronic system.

Figure 1:
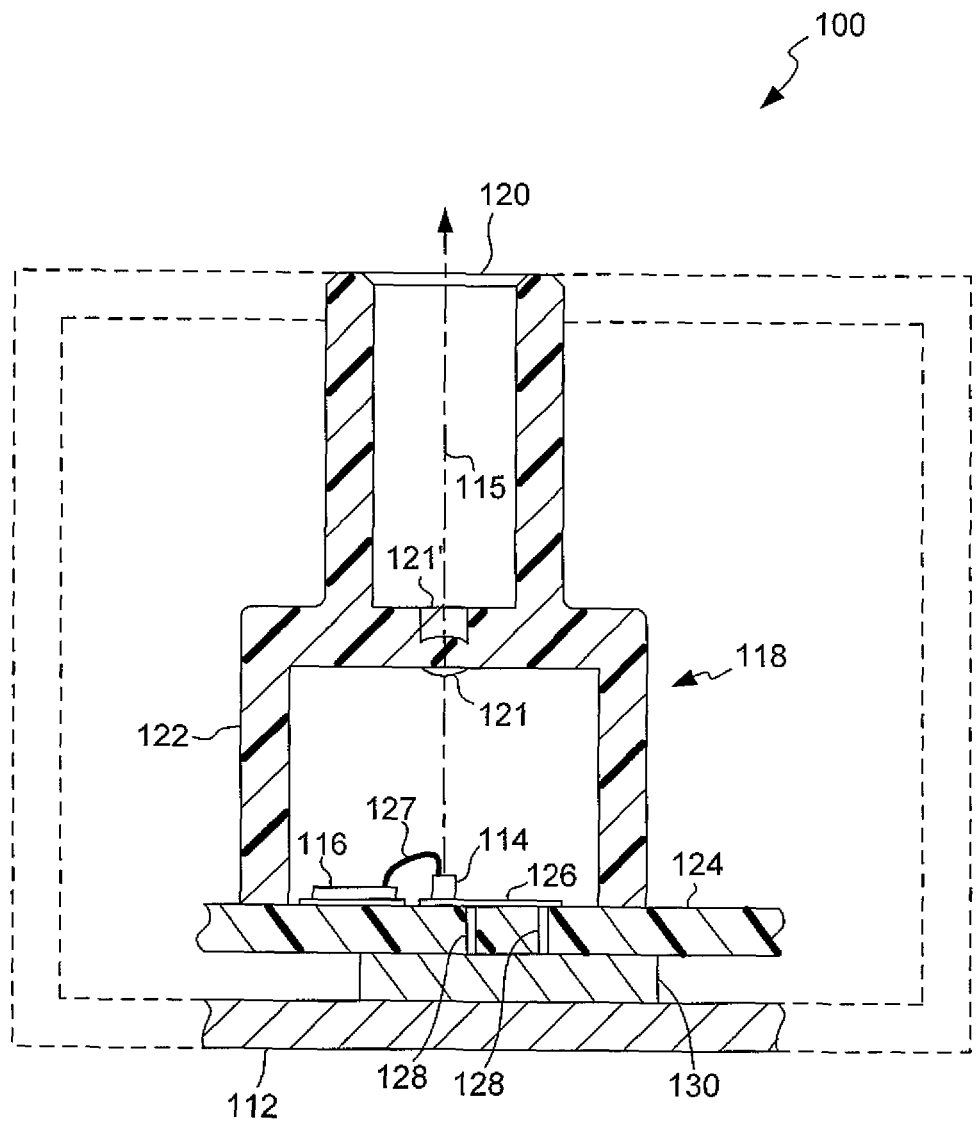
FIG. 1 is a sectional view of a generalized portion of an opto-electronic transmitter module, in accordance with the prior art.
Figure 2:
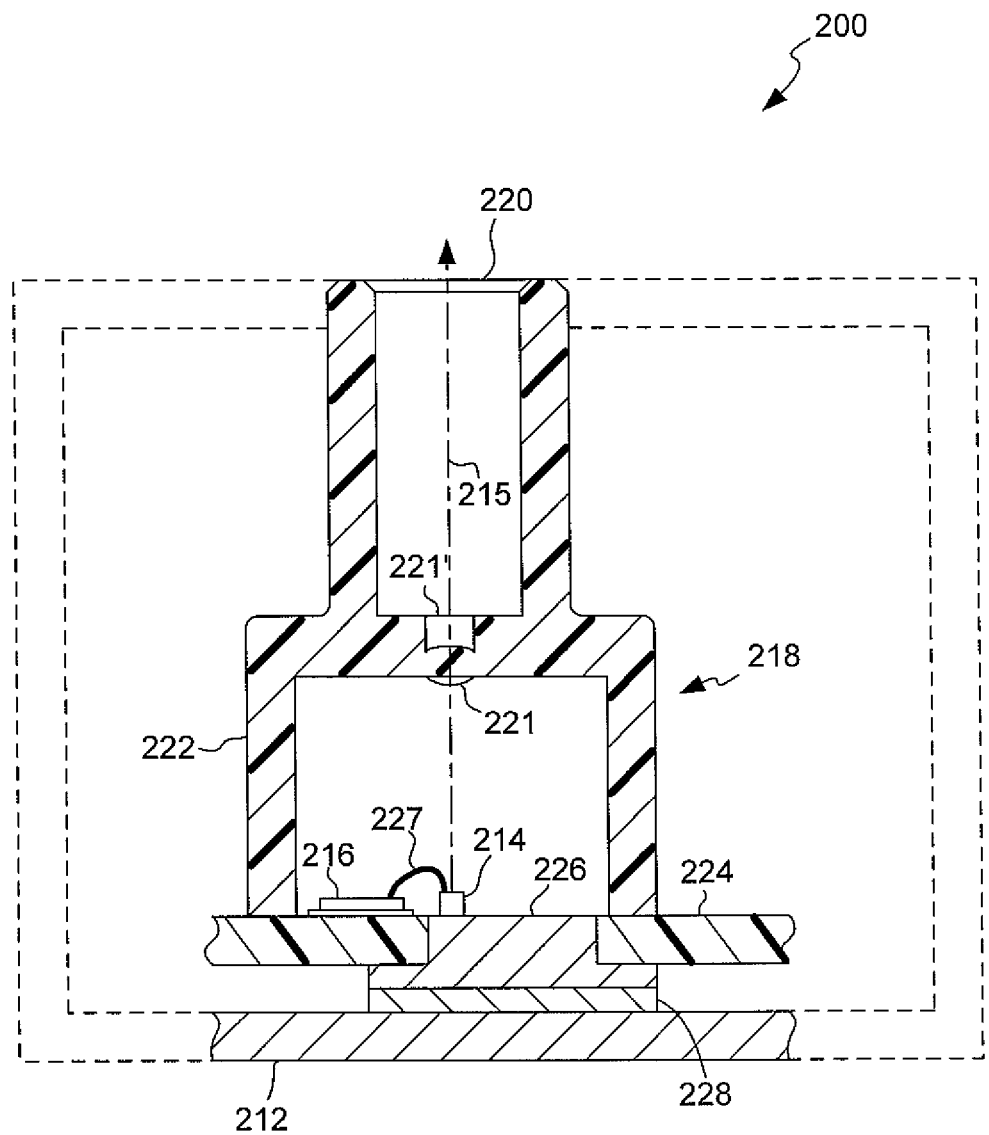
FIG. 2 a sectional view of a generalized portion of another opto-electronic transmitter module, in accordance with the prior art.

In exemplary embodiments, cylindrical protrusion 328 may remove sufficient excess heat to avoid damage to a typical VCSEL by forming cylindrical protrusion 328 unitarily with interior metal wall 329 in a configuration such that cylindrical protrusion 328 extends perpendicularly from interior metal wall 329 and has a diameter of between about 0.8 mm and 1.0 mm. It should be noted that the term "unitarily formed" means that the elements are part of the same unitary metal mass and are not separate parts joined together. For example, the metal walls of housing 312 can be elements of a die-cast unitary metal structure. As protrusion 328 has a larger diameter and accordingly larger volume than the volumes of vias or metal slugs in the prior solutions shown in FIGS. 1 and 2, protrusion 328 correspondingly conducts heat more efficiently. Also, as protrusion 328 is unitarily formed with the remainder of the metal wall of housing 312, the number of thermal interfaces is less than the number of thermal interfaces in prior solutions, such as those described above with regard to FIGS. 1 and 2. That is, there is no interface between protrusion 328 and the remainder of the wall because they are part of the same metal mass. Minimizing the number of thermal interfaces and accordingly minimizing the number of individual parts not only promotes thermal efficiency but also promotes manufacturing economy, as fewer individual parts are involved than in the prior solutions and the number of manufacturing steps is less than in the prior solutions.

Figure 4:
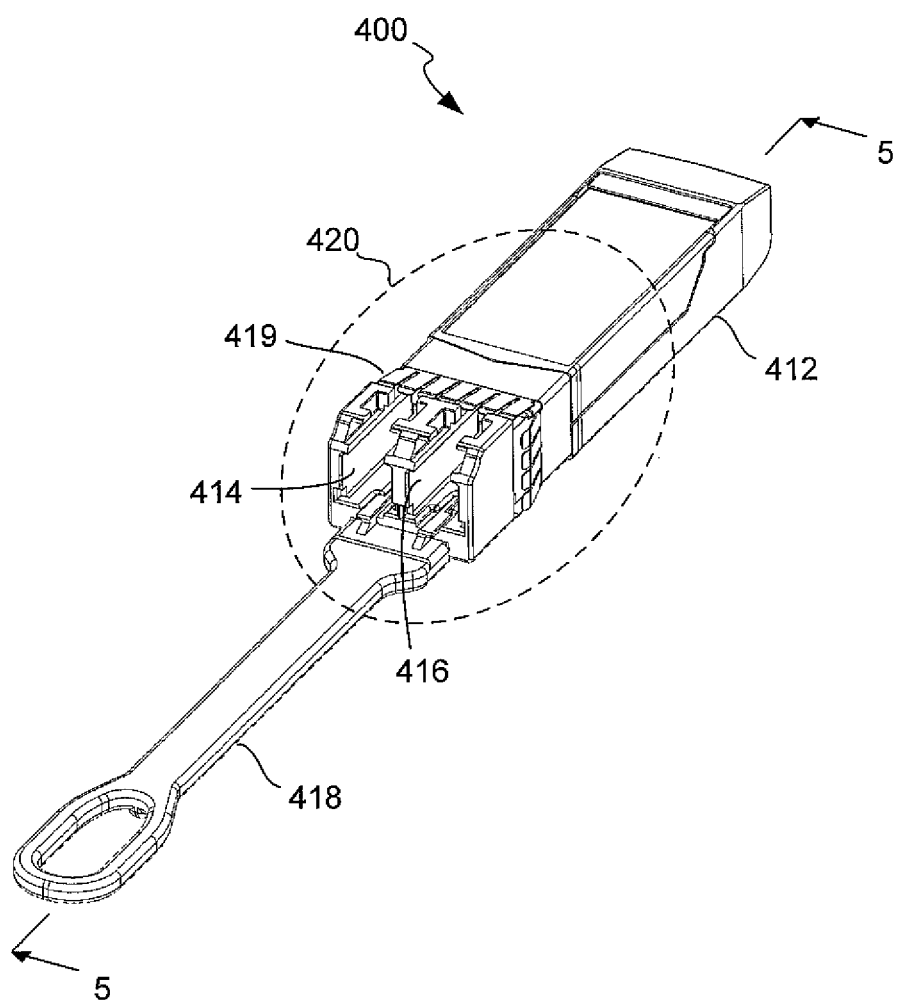
FIG. 4 is a perspective view of the opto-electronic transceiver module of FIG. 3.

As illustrated in further detail in FIG. 4, in an exemplary embodiment opto-electronic transceiver module 300 can be, for example, a SFF or SFP-type transceiver module 400. Transceiver module 400 includes an elongated housing 412 having optical signal ports 414 and 416 at its forward end. Transceiver module 400 also includes a handle 418 at its forward end that can assist in removing or unplugging it from an electronic system (not shown). As well understood by persons skilled in the art, the rearward end of housing 412 can be plugged into a bay of an electronic system (not shown) and interfaces electrically with such a system. Transceiver module 400 can interface optically with a pair of fiber-optic cable assemblies having plugs (not shown) that can be plugged into optical signal ports 414 and 416. Transceiver module 400 can receive optical signals via optical signal port 414 and transmit optical signals via optical signal port 416, as described in further detail below. An electromagnetic interference (EMI) shield 419 near the forward end of housing 412 helps shield the electronic circuitry within housing 412 against EMI when transceiver module 400 is plugged into a bay of an electronic system.

Figure 5:
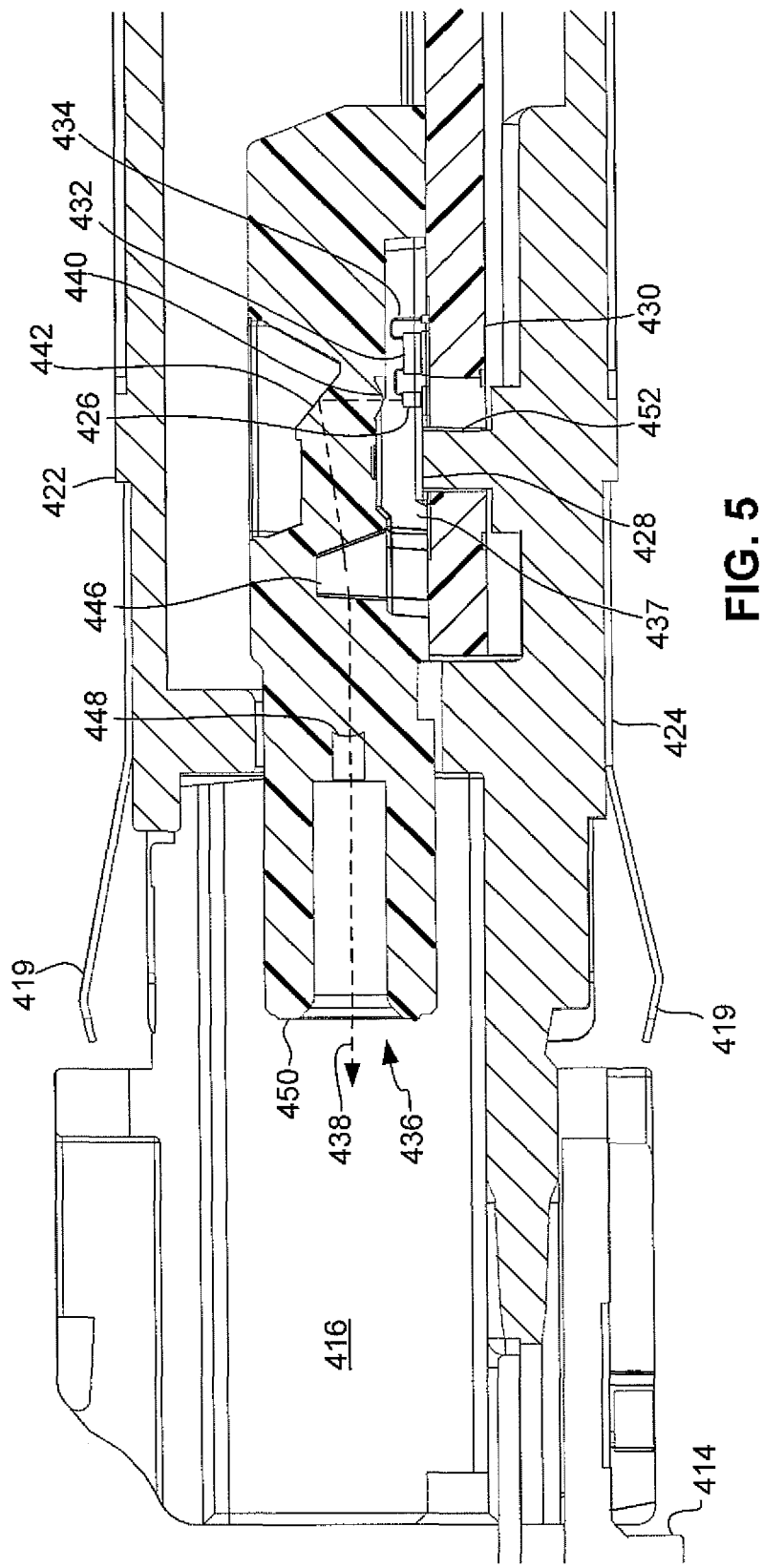
FIG. 5 is a sectional view, taken on line 5-5 of FIG. 4.
Figure 6:
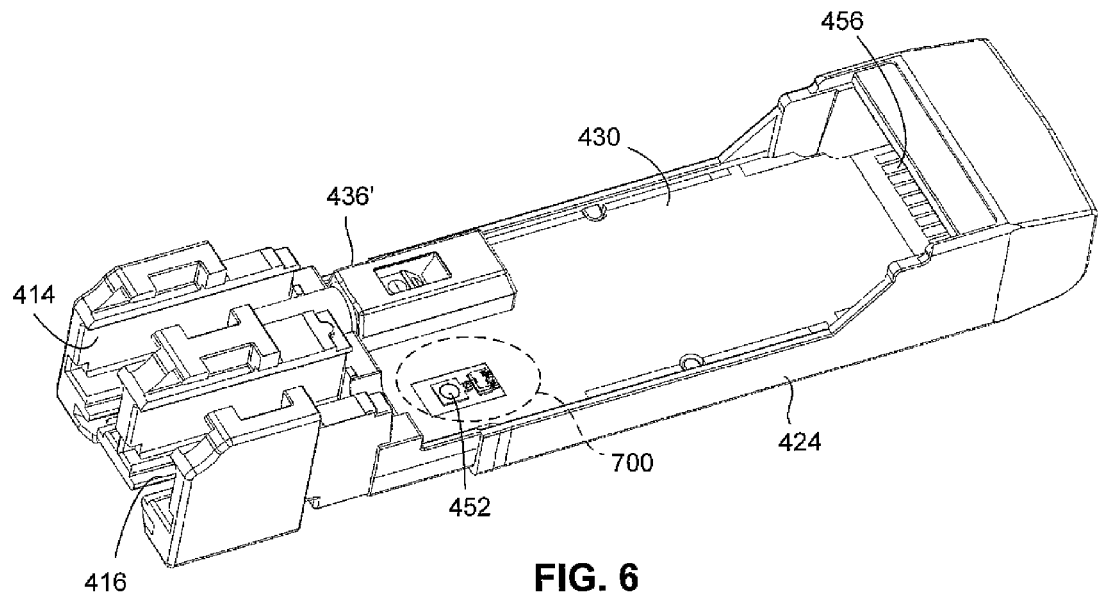
FIG. 6 is a perspective view of the interior of the opto-electronic transceiver module of FIGS. 3-5, with an optical assembly removed to show the heat-dissipating protrusion.
Figure 7:
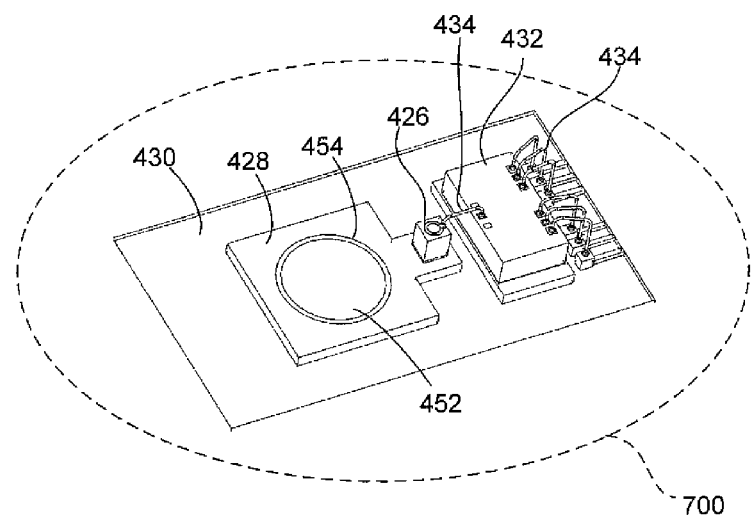
FIG. 7 is a perspective view of an enlarged region 700 of FIG. 6.
Figure 8:
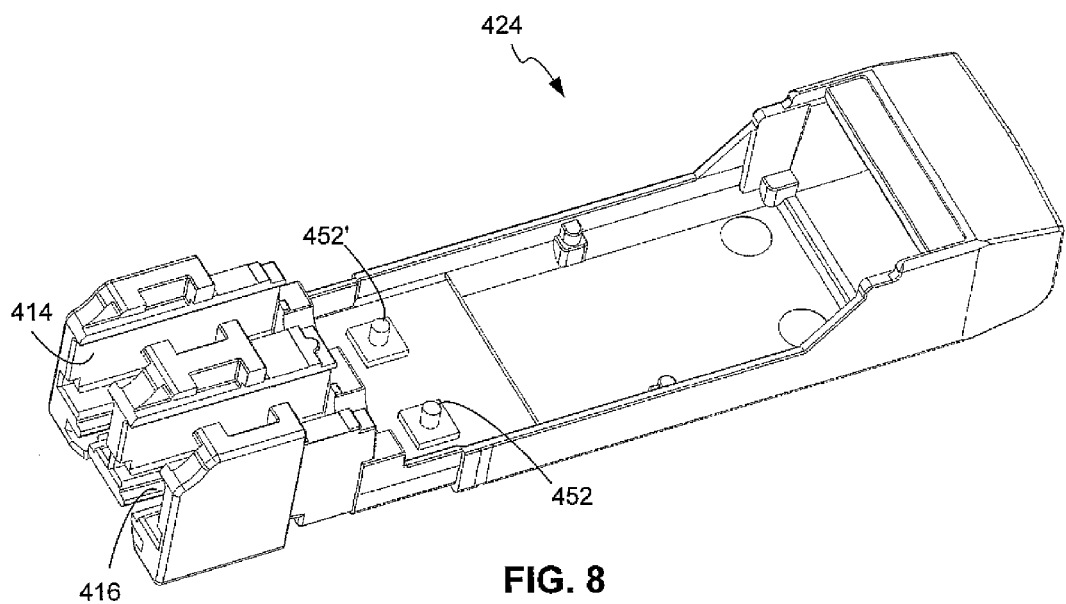
FIG. 8 is a perspective view of the lower housing portion of the opto-electronic transceiver module of FIGS. 3-4.
Figure 9:
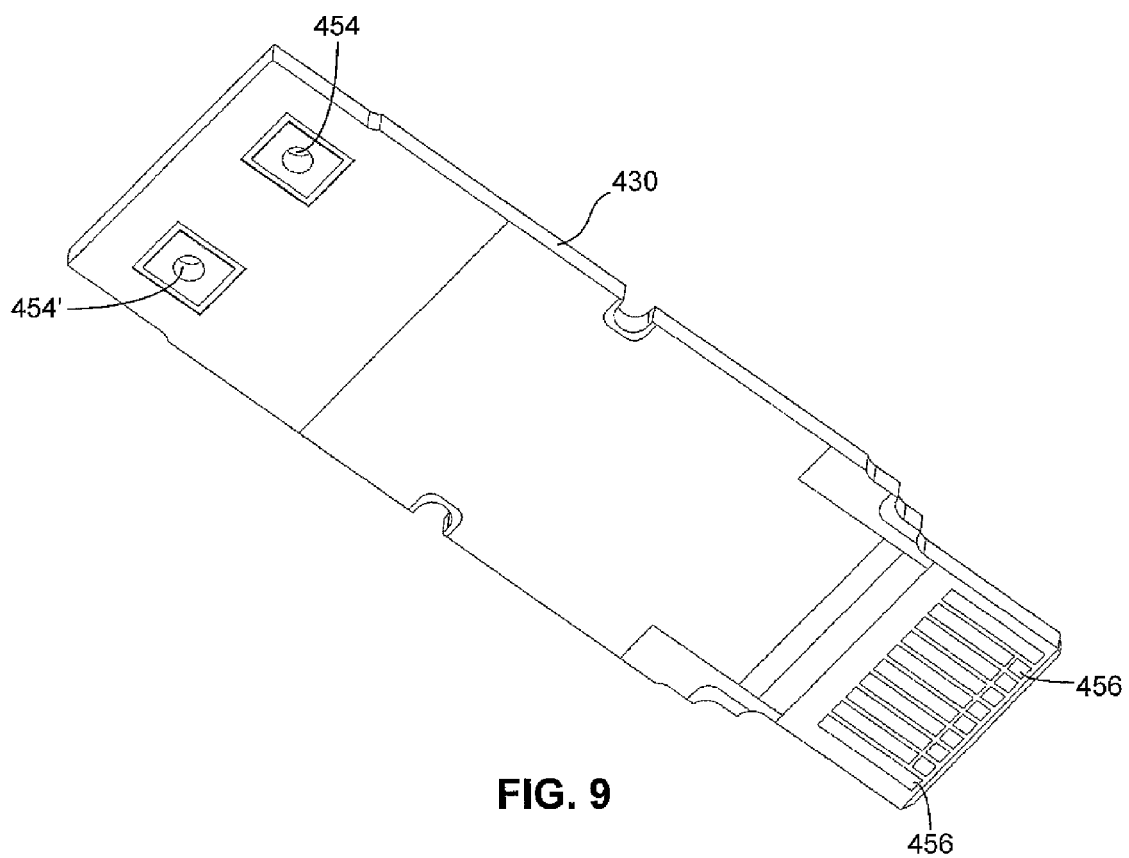
FIG. 9 is a perspective view of the lower surface of the printed circuit board of the opto-electronic transceiver module of FIGS. 3-4.

A cross section of a region 420 of transceiver module 400 is shown in further detail in FIG. 5. Housing 412 (FIG. 4) includes an upper housing portion 422 and a lower housing portion 424. Upper housing portion 422 and lower housing portion 424 are made of metal to provide EMI shielding, mechanical integrity, and heat dissipation. Each of upper housing portion 422 and lower housing portion 424 can be die cast as a unitary metal structure to promote not only such EMI shielding, mechanical integrity and heat dissipation but also economy of manufacture. A laser 426, such as a VCSEL, is mounted on a metal region 428 on the upper surface of a printed circuit board 430. An integrated circuit chip 432 is also mounted on the upper surface of printed circuit board 430. Wirebonds 434 interconnect laser 426, integrated circuit chip 432 and electrical interconnections or traces printed on the surface of printed circuit board 430.

An optical assembly 436, which can be made of an optically transparent plastic material, is mounted on the upper surface of printed circuit board 430. Laser 426 and integrated circuit chip 432 are sealed within a cavity 437 in optical assembly 436. In operation, when laser 426 is energized, the light emitted by laser 426 is transmitted along a path 438 by the combined effect of optical elements of optical assembly 436 that can include a first lens 440, a reflective surface 442, refractive walls of a cavity 446, and a second lens 448. Note that path 438 includes a 90-degree redirection of the light beam. The light is emitted through the receptacle end 450 of optical assembly 436. Although not shown for purposes of clarity, in operation, the plug end of an optical fiber cable is received in receptacle end 450. The light enters the end of the optical fiber and is transmitted through the cable. It should be noted that when laser 426 is in operation, it emits a substantial amount of heat.

As further illustrated in FIGS. 6-9, a protrusion 452 that is unitarily formed with the interior wall of lower housing portion 424 extends through an opening 454 (FIGS. 7 and 9) in printed circuit board 430. (Optical assembly 436 is removed in FIG. 6 to show protrusion 452.) Opening 454 can be a plated through-hole similar to a conventional via or metal slug but larger in diameter. For example, a protrusion 452 having a diameter of between about 0.8 mm and 1.0 mm may be suitable to remove sufficient excess heat to avoid damage to a typical VCSEL. During operation of laser 426, protrusion 452 conducts excess heat produced by laser 426 away from metal region 428. As protrusion 452 is unitarily formed with a metal wall of lower housing portion 424, protrusion 452 transmits this excess heat to other regions of lower housing portion 424. Although not shown, when opto-electronic transceiver module 400 (FIG. 4) is plugged into a bay or port in an electronic system and is operating, this excess heat is dissipated from housing 412 by air flow or additional heat sinks that are included in the electronic system. The electrical contact pads 456 on printed circuit board 430 that can electrically connect opto-electronic transceiver module 400 to such an electronic system when opto-electronic transceiver module 400 is plugged in are visible in FIGS. 6 and 9.

It should be noted that although the heat dissipating system and method is described above with regard to an example relating to dissipating heat produced by laser 426, other exemplary embodiments of the system and method can relate to dissipating heat produced by additional or different devices. For example, referring again to FIG. 6, heat that is produced by an opto-electronic receiver device (not shown), such as a photodiode, mounted on a metal region (not shown) of printed circuit board 430 beneath another optical assembly 436' that is similar to the above-described optical assembly 436 can be similarly dissipated. That is, a protrusion 452' (FIG. 8) that is similar to the above-described protrusion 452 extends through another opening 454' (FIG. 9) in printed circuit board 430 and similarly transmits heat that is produced by the photodiode to housing 412. It should also be noted that although in the above-described embodiment transceiver module 400 includes a laser (i.e., an opto-electronic transmitter device) and a photodiode (i.e., an opto-electronic receiver device), in still other embodiments the system can have only one or the other type of opto-electronic communication device. For example, in another exemplary embodiment (not shown) a transmitter-only module can include one or more lasers or other opto-electronic transmitter devices and not include any photodiodes or other opto-electronic receiver devices. Conversely, in still another exemplary embodiment (not shown) a receiver-only module can include one or more photodiodes or other opto-electronic receiver devices and not include any lasers or other opto-electronic transmitter devices. In each such embodiment, the housing can include a protrusion that is unitarily formed in a metal or otherwise thermally conductive wall of the housing and extends through the printed circuit board or other circuit substrate to provide a thermal path to promote dissipation of heat emitted by the opto-electronic communication device or other device or devices.

One or more illustrative embodiments of the invention have been described above. However, it is to be understood that the invention is defined by the appended claims and is not limited to the specific embodiments described.

What is claimed is:

1. An opto-electronic communication module, comprising:
    a circuit substrate providing electrical interconnections for circuitry mounted on the circuit substrate, the circuit substrate having an opening extending therethrough from a first surface of the circuit substrate to a second surface of the circuit substrate;
    an opto-electronic communication device mounted on a metalized layer of the first surface of the circuit substrate, the metalized layer of the first surface of the circuit substrate being disposed on a non-metallic layer of the first surface of the circuit substrate; and
    a housing having a plurality of metal walls substantially enclosing the circuit substrate, the housing further having an optical signal port, one of the plurality of metal walls adjacent to the second surface of the circuit substrate having a protrusion unitarily formed in the one of the plurality of metal walls, the protrusion extending through the opening in the circuit substrate and contacting the metalized layer on the first surface of the circuit substrate.

2. The opto-electronic communication module of claim 1, wherein the circuit substrate comprises a printed circuit board.

3. The opto-electronic communication module of claim 1, wherein the opto-electronic communication device comprises a laser.

4. The opto-electronic communication module of claim 1, further comprising an integrated circuit device mounted on the first surface of the circuit substrate adjacent the opto-electronic communication device and electrically connected to the opto-electronic communication device.

5. The opto-electronic communication module of claim 1, wherein the opto-electronic communication device emits light in a direction normal to the first surface of the circuit substrate.

6. The opto-electronic communication module of claim 5, wherein an optical assembly is attached to the first surface of the circuit substrate over the opto-electronic communication device and over a location at which the protrusion contacts the metalized layer on which the opto-electronic communication device is mounted.

7. The opto-electronic communication module of claim 6, wherein the optical assembly redirects the light emitted by the opto-electronic communication device at an angle of substantially 10 degrees toward the optical signal port.

8. The opto-electronic communication module of claim 7, wherein the optical assembly is made of an optically transparent material, a portion of the optical signal port is formed in the optically transparent material, and a reflector is formed in the optically transparent material and configured to redirect the light along an optical path passing through the optically transparent material.

9. The opto-electronic communication module of claim 8, wherein the optically transparent material has a cavity with a perimeter in contact with the first surface of the circuit substrate, and the opto-electronic communication device mounted on the metalized layer of the first surface of the circuit substrate is sealed within the cavity.

10. The opto-electronic communication module of claim 1, wherein the housing has an elongated, rectangular shape elongated between first and second ends and substantially corresponding to a Small Form Factor (SFF) format, wherein the optical signal port is disposed in the first end of the housing and a plurality of electrical contacts are disposed in the second end of the housing.

11. A method of operation of an opto-electronic communication module, the opto-electronic communication module comprising a housing having a plurality of metal walls, a circuit substrate having first and second opposing surfaces and substantially enclosed by the housing, and an opto-electronic communication device mounted on a metalized layer of the first surface of the circuit substrate, the method comprising:
   operating the opto-electronic communication device with respect to an optical beam, the optical beam traversing a path between an optical signal port of the housing and the opto-electronic communication device, the opto-electronic communication device emitting heat in response to being operated;
   the metalized layer receiving the heat emitted by the opto-electronic communication device mounted thereon, the metalized layer being disposed on a non-metallic layer of the first surface of the circuit substrate; and
   a protrusion unitarily formed with a wall of the housing and extending through an opening in the circuit substrate transmitting the heat from the metalized layer to the wall of the housing.

12. The method of claim 11, wherein the circuit substrate comprises a printed circuit board.

13. The method of claim 11, wherein the opto-electronic communication device comprises a laser.

14. The method of claim 11, wherein the opto-electronic communication module further comprises an integrated circuit device mounted on the first surface of the circuit substrate adjacent the opto-electronic communication device and electrically connected to the opto-electronic communication device.

15. The method of claim 11, wherein the opto-electronic communication device emits light in a direction normal to the first surface of the circuit substrate.

16. The method of claim 15, wherein an optical assembly is attached to the first surface of the circuit substrate over the opto-electronic communication device and over a location at which the protrusion contacts the metalized layer on which the opto-electronic communication device is mounted.

17. The method of claim 16, wherein the optical assembly redirects the light emitted by the opto-electronic communication device at an angle of substantially 90 degrees toward the optical signal port.

18. The method of claim 17, wherein the optical assembly is made of an optically transparent material, a portion of the optical signal port is formed in the optically transparent material, and a reflector is formed in the optically transparent material and configured to redirect the optical beam along a portion of the path that passes through the optically transparent material.

19. The method of claim 18, wherein the optically transparent material has a cavity with a perimeter in contact with the first surface of the circuit substrate, and the opto-electronic communication device mounted on the metalized layer of the first surface of the circuit substrate is sealed within the cavity.

20. The method of claim 11, wherein the housing has an elongated, rectangular shape elongated between first and second ends and substantially corresponding to the Small Form Factor format, wherein the optical signal port is disposed in the first end of the housing and a plurality of electrical contacts are disposed in the second end of the housing.

* * * * *